(12) United States Patent
Hirata (10) Patent No.: US 6,609,981 B2
(45) Date of Patent: Aug. 26, 2003

(54) AERODYNAMIC SHAFT FOR GOLF CLUB

(75) Inventor: Junichi Hirata, Gifu-ken (JP)

(73) Assignee: Retug, Inc., Rosslyn, NY (US)

( * ) Notice: Subject to any disclaimer, the term of this patent is extended or adjusted under 35 U.S.C. 154(b) by 0 days.

(21) Appl. No.: 10/072,839

(22) Filed: Feb. 6, 2002

(65) Prior Publication Data

US 2002/0072432 A1 Jun. 13, 2002

Related U.S. Application Data

(63) Continuation of application No. 09/360,940, filed on Jul. 26, 1999, now abandoned.

(51) Int. Cl.[7] .................... A63B 53/10; A63B 53/12; A63B 59/02; A63B 59/06
(52) U.S. Cl. .................... 473/316; 473/317; 473/564; 473/524; 473/559
(58) Field of Search ................ 473/316–317, 473/228, 457, 525, 537, 559, 564, 318–323, 524; D21/756, 757; 137/808; 244/130; 43/18.1 R; 138/39; 74/551.1, 551.8; 280/819; 440/101

(56) References Cited

U.S. PATENT DOCUMENTS

| | | | | |
|---|---|---|---|---|
| 1,983,074 A | * | 12/1934 | Durell | |
| 1,996,298 A | * | 4/1935 | Lard | 273/77 |
| 2,150,737 A | * | 3/1939 | Chittick | |
| 4,059,129 A | * | 11/1977 | Feis | |
| 4,737,126 A | * | 4/1988 | Lindeberg | |
| 5,795,244 A | * | 8/1998 | Lu | 473/317 |
| 5,909,782 A | * | 6/1999 | Pluff | |

OTHER PUBLICATIONS

Umazume, Fluid Resistivity Reducing Structure of Cylindrical Body, Nov. 8, 2001, PG PUB. No. U.S. 2001/0039216 A1.*

* cited by examiner

Primary Examiner—Sebastiano Passaniti
(74) Attorney, Agent, or Firm—Winston & Strawn (57) ABSTRACT

A shaft adapted to move through a fluid, wherein the shaft has a surface, diameter, and length, and wherein the shaft comprises at least two ridges extending along at least a portion of the length, such that fluid resistance encountered by the shaft as it is moved through the fluid is reduced.

22 Claims, 11 Drawing Sheets

| Height (H) as a function of shaft diameter (d). | Optimal Location (θ) |
|---|---|
| 0.0125(d) | 91°- 93° |
| 0.0175(d) | 91°- 96° |
| 0.025(d) | 96° - 103° |
| 0.05(d) | 102° - 117° |

FIG. 4

| Ridge | Height H | Ridge Location Angle θ | Resistance Coefficient |
|---|---|---|---|
| A | 0.125 mm | 90 | 1.151 |
| | | 92 | 1.075 |
| | | 93 | 1.111 |
| B | 0.175 mm | 90 | 1.238 |
| | | 92 | 1.066 |
| | | 93 | 1.104 |
| | | 95 | 1.105 |
| | | 97 | 1.106 |
| | | 100 | 1.108 |
| C | 0.250 mm | 90 | 1.342 |
| | | 93 | 1.240 |
| | | 95 | 1.152 |
| | | 97 | 1.074 |
| | | 100 | 1.069 |
| | | 102.5 | 1.104 |
| | | 105 | 1.108 |
| D | 0.500 mm | 100 | 1.246 |
| | | 105 | 1.047 |
| | | 110 | 1.051 |
| | | 115 | 1.092 |
| | | 120 | 1.108 |
| | | 125 | 1.097 |

| WIDTH W | RESISTANCE COEFFICIENT |
|---------|------------------------|
| 0.5     | 1.074                  |
| 0.75    | 1.056                  |
| 1.0     | 1.065                  |
| 1.25    | 1.072                  |
| 1.5     | 1.073                  |

| No. | LOCATION ANGLE OF THE SECOND RIDGE ($\alpha$) | RESISTANCE COEFFICIENT |
|---|---|---|
| 1 | | 1.069 |
| 2 | 130 | 1.060 |
| 2 | 135 | 1.066 |
| 2 | 140 | 1.093 |

FIG. 8B

| No. | LOCATION ANGLE OF THE SECOND RIDGE ($\alpha$) | RESISTANCE COEFFICIENT |
|---|---|---|
| 1 | | 1.065 |
| 2 | 130 | 1.054 |
| 2 | 140 | 1.065 |

AERODYNAMIC SHAFT FOR GOLF CLUB

RELATED APPLICATIONS

This application is a continuation of U.S. application Ser. No. 09/360,940, filed Jul. 26, 1999 now abandoned, the content of which is expressly incorporated herein by reference thereto.

FIELD OF THE INVENTION

The present invention relates to sports devices which include a shaft or rod in its construction, particularly sports devices where the shaft is moved at high speeds through the air.

BACKGROUND OF THE INVENTION

Many sports devices incorporate a shaft or rod in their construction. Some examples include golf clubs, baseball bats, fishing poles, ski poles, rackets (such as a tennis racket), lacrosse sticks, bicycle frames, and rowing oars. In use, these shafts are typically moved through a fluid such as air or water, and it is generally desirable to move these shafts at high speeds. One method of increasing the speed at which a shaft moves through the air is to increase the force applied to the shaft. Another method of increasing the shaft speed is to decrease the forces, including fluid resistance, that counter the shaft movement.

As explained in *Fundamentals of Fluid Mechanics* by Philip M. Gerhart and Richard J. Gross (copyright © 1985 by Addison-Wesley Publishing Co.), moving a shaft, such as a golf club shaft, through a fluid such as air causes air to flow around the shaft. If viscous forces are minimal, the air flow pattern and pressure distribution are generally symmetrical about the midplane of the shaft. If, however, viscous forces are taken into account, the analysis of the air flow becomes quite different. There is a region, i.e., the boundary layer, that develops at the surface of the shaft where the velocity of the fluid increases from zero to the free-stream value. There are significant shear stresses in the boundary layer fluid, even if the viscosity is small. The flow outside the boundary layer is determined by a balance between pressure force and fluid momentum. On the front or upstream of the shaft, the fluid momentum increases and the pressure drops while on the back side or downstream of the shaft, the fluid exchanges momentum for increasing pressure. In the boundary layer, on the other hand, the flow is determined by a balance between momentum and pressure in addition to viscous forces. Because of viscosity, the fluid inside the boundary layer has less momentum than the fluid outside the boundary layer. As the pressure begins to rise, it is necessary for the fluid back stream of the shaft to exchange momentum for pressure. Since the boundary layer is deficient in momentum, it is unable to penetrate very far into the rising pressure. The pressure causes the fluid in the boundary layer to stop and, ultimately, reverse direction. The boundary layer then separates from the shaft surface at a separation point and a broad wake is formed behind the shaft. The separating boundary layer pushes the flow streamlines outward and so alters the entire flow pattern and pressure distribution. The pressure on the rear of the shaft, in the wake, is low and approximately constant. The pressure on the front of the shaft is high, so there is a net pressure force (form drag) on the shaft. The shear stress on the shaft surface produces friction drag. The drag coefficient is a dimensionless parameter, which may be derived by dividing the drag force by the following:

$$\tfrac{1}{2} * \rho * V^2 * 1^2.$$

At Reynolds numbers (i.e., $Re=(\rho*V*1)/(\mu)$, another dimensionless parameter typically used to decide whether flow is laminar or turbulent) greater than about 50, vortices are shed from the shaft downstream of the shaft. These vortices are shed alternately from the top and the bottom of the shaft with a definite frequency. The vortices trail behind the shaft in two rows called a Karman's vortex street. The oscillating streamline pattern caused by the alternate vortex shedding causes a fluctuating pressure force on the shaft and hence a time-varying load. The frequency of the fluctuating force is equal to the frequency of the vortex shedding. The frequency of vortex shedding is governed by the Strouhal number (S), which may be derived by the following formula:

$$(\omega*1)/V.$$

Thus, when the shaft is moved or swung at a high speed, the pressures on the shaft make it difficult to move the shaft along a straight path. This is a particularly troublesome problem for golfers who are trying to squarely hit a golf ball. Similar problems are encountered with other sports devices, such as baseball bats, fishing poles, and tennis rackets. Thus, there is a need for a sports shaft or rod that is more aerodynamic and does not exhibit these problems.

SUMMARY OF THE INVENTION

The present invention satisfies this need by providing a shaft or rod with improved stability and decreased resistance, which will ultimately improve the performance of the user. The construction of the shaft of the present invention effectively lowers the coefficient of drag acting on the shaft and reduces the effect of Karman's vortex street.

The present invention relates to a shaft adapted to move through a fluid, wherein the shaft has at least two longitudinal raised surface ridges extending along at least a portion of the length of the shaft, such that fluid resistance encountered by the shaft as it is moved through the fluid is reduced.

Preferably, the shaft has a generally circular cross-sectional area and diameter; a leading edge on the surface of the shaft along the length of the shaft, which generally leads the shaft's movement through the fluid; and at least two ridges located on the surface of the shaft along at least a portion of the length of the shaft, wherein the at least two ridges are located less than 180° apart and at least 90° from the leading edge of the shaft.

The present invention also relates to a shaft which is incorporated into various sports devices. The shaft of the present invention includes ridges, wherein the cross sectional area of the ridges are small compared to the cross sectional area of the shaft itself. This shape reduces fluid resistance and stabilizes the shaft while in motion, thereby improving the performance of the sports device. Reducing the resistance is accomplished by improving the distribution of air pressure along the shaft surface due to the presence and location of the ridges. The use of this novel shaft is contemplated for various sports devices such as a golf club, a fishing pole, a baseball bat, a ski pole, a tennis racket, a lacrosse stick, a bicycle frame, or a rowing oar.

BRIEF DESCRIPTION OF THE DRAWINGS

Reference is next made to a brief description of the drawings, which are intended to illustrate the present invention. The drawings and detailed descriptions which follow are intended to be merely illustrative, and are not intended to limit the scope of the invention as set forth in the appended claims.

DETAILED DESCRIPTION OF THE INVENTION

Figure 1:
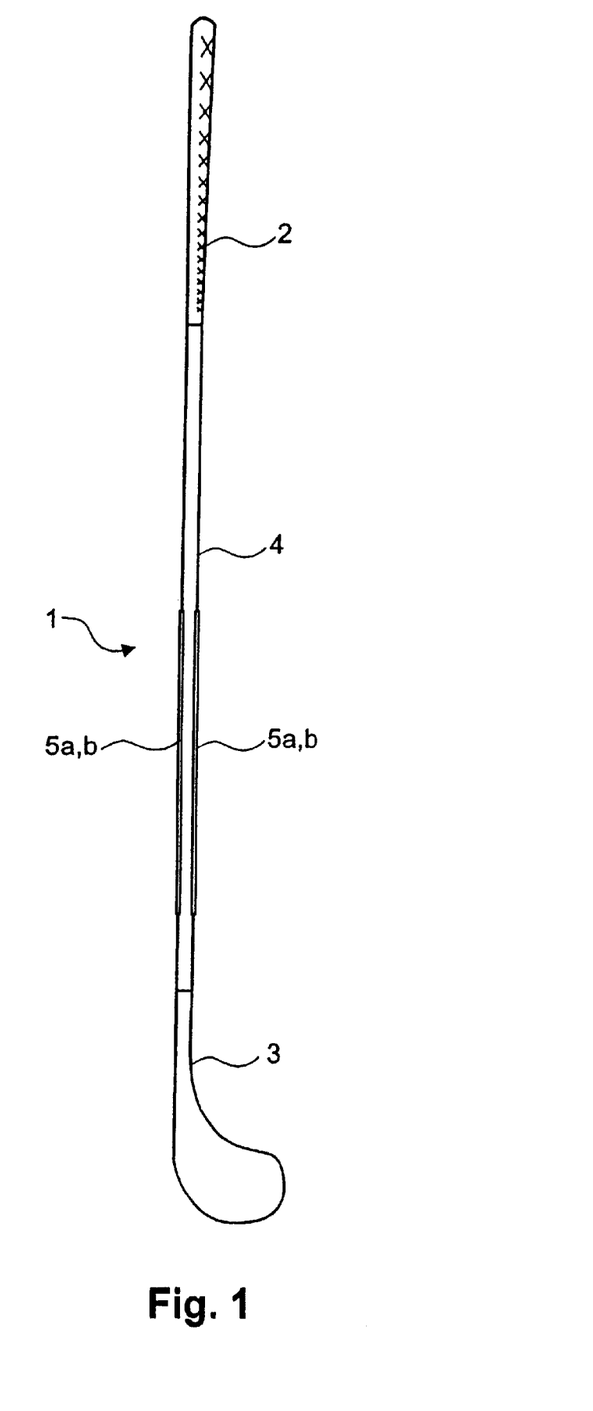
FIG. 1 is a golf club which includes the low drag shaft of the present invention.

As shown in FIG. 1, golf club 1 includes shaft 4 with grip 2 at one end and head 3 at the other end. Golf club 1 may comprise a wood, iron, or putter, and may include any head 3 known in the art as well as any grip 2 known in the art. Shaft 4 is constructed of graphite, steel, fiberglass, or other appropriate materials known in the art. Grip 2 is typically made of leather, rubber, or similar materials.

Figure 2:
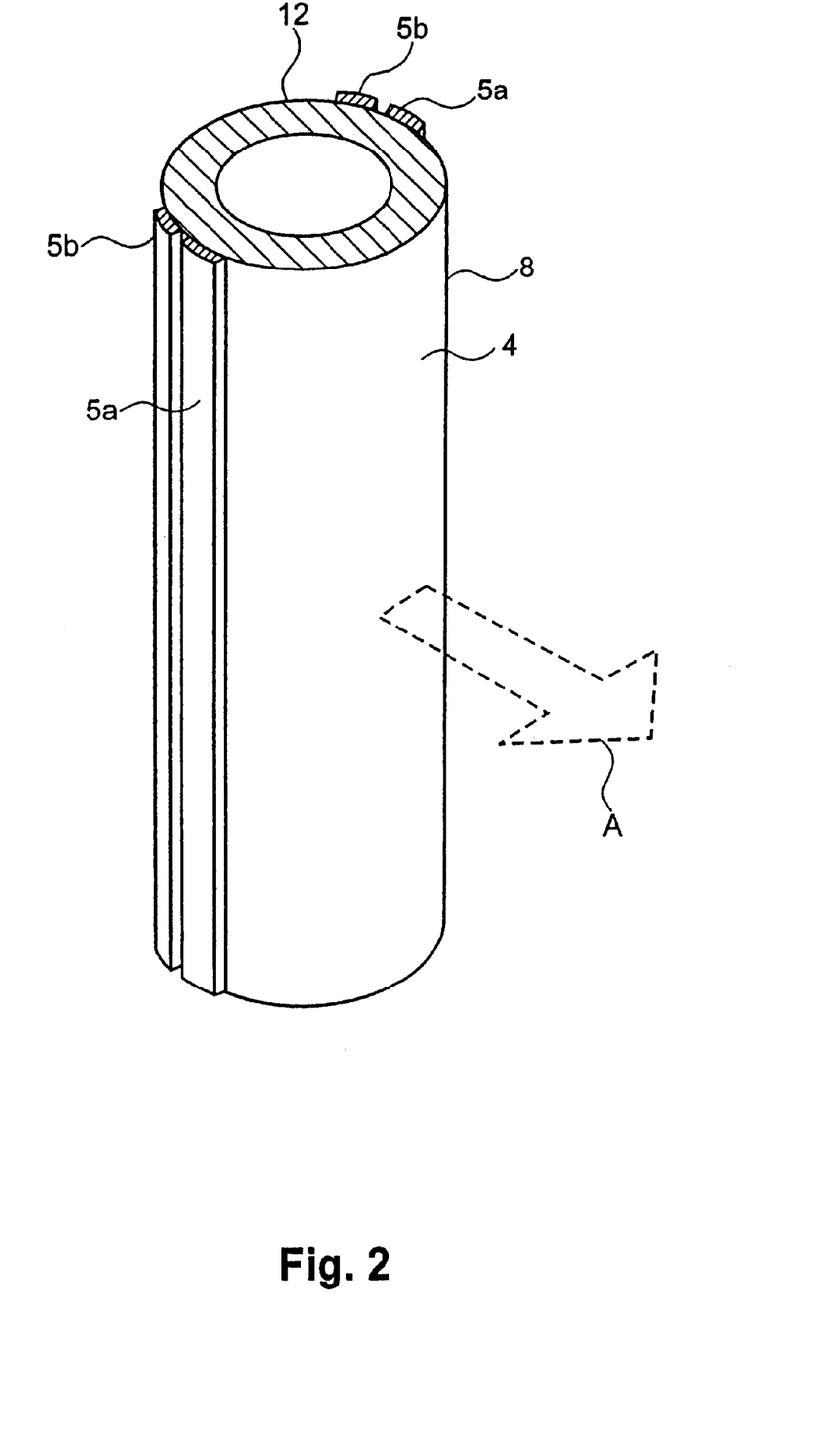
FIG. 2 is a perspective view of a portion of the shaft having two sets of longitudinal ridges.

As shown in FIG. 2, shaft 4 includes longitudinal ridges 5a and 5b that extend along the length of shaft 4, preferably along at least one third of the length of the shaft on the trailing portion thereof, beginning from the end of the shaft that is attached to the head of the club. Shaft 4 is a cylindrical member with a generally circular cross section. In the preferred embodiment, the diameter of shaft 4 is approximately 14 mm at grip 2 and tapers down to approximately 8.5 mm at head 3. The diameter of shaft 4 around its mid point is approximately 10 mm. In alternative embodiments, however, the shaft diameter may be constant along its length, or may taper in the opposite direction from head 3 to grip 2, or the shaft diameter may vary according to an alternative configuration. Arrow A indicated by the dotted line in FIG. 2 indicates the direction of shaft 4 as it is swung. When shaft 4 is in motion, air flows around it in a direction that is generally opposite to the direction of the shaft's motion. In other words, air flows in a direction that is generally opposite to arrow A. Datum point P (shown in FIGS. 3a and 3b) indicates the point on the surface of shaft 4, which is the first to encounter fluid flow when shaft 4 is in motion and is disposed along plane 16, which passes through the shaft. The leading edge or line of shaft 4 simply comprises an extension of datum point P along the length of the shaft.

Figure 3A:
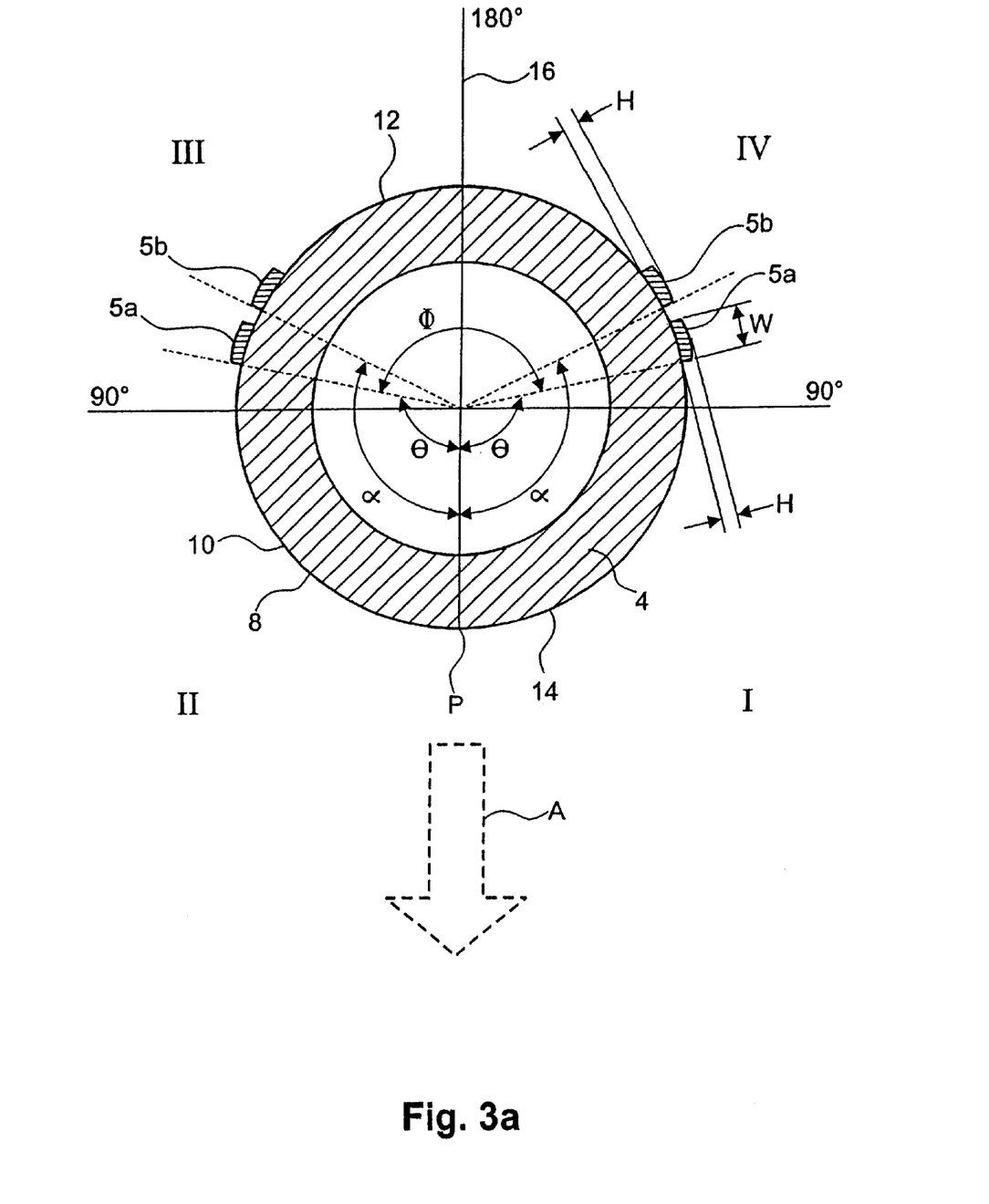
FIG. 3a is a cross sectional view of the shaft.

As shown in FIGS. 2 and 3a, shaft 4 comprises surface 8 upon which are affixed four ridges, including two sets of two ridges 5a and 5b. All ridges 5a, 5b are generally rectangular in cross section, having height H and width W. The height H is approximately constant along the width of the ridges 5a, 5b, and therefore each ridge curves slightly along the cross sectional circumference of shaft 4. In alternative embodiments, the cross-sectional shape of the ridges 5a, 5b may be square (wherein H=W), circular, semi-circular, elliptical, polygonal, oblong, or other desired shape that projects from surface 8 of shaft 4. In addition, the cross-sectional shape is not limited to a regular geometric shape, but may have irregular contours. In addition, each ridge may have a different cross sectional shape than the other ridges. For example, one shaft may include two rectangular ridges and two semi-circular ridges. Apart from these ridges, surface 8 of shaft 4 is generally smooth.

As shown in FIG. 2, height H and width W remain constant along shaft 4. In alternative embodiments, height H and width W may vary along the length of shaft 4. For example, height H may decrease along the length of shaft 4, resulting in a ridge that tapers either from grip 2 to head 3 or from head 3 to grip 2. More specifically, ridge height H may vary corresponding to variations in the outer diameter of shaft 4. For example, in an embodiment in which the outer diameter of the shaft 4 tapers from grip 2 to head 3, height H of ridges 5a, 5b may similarly decrease or taper from grip 2 to head 3.

Figure 3B:
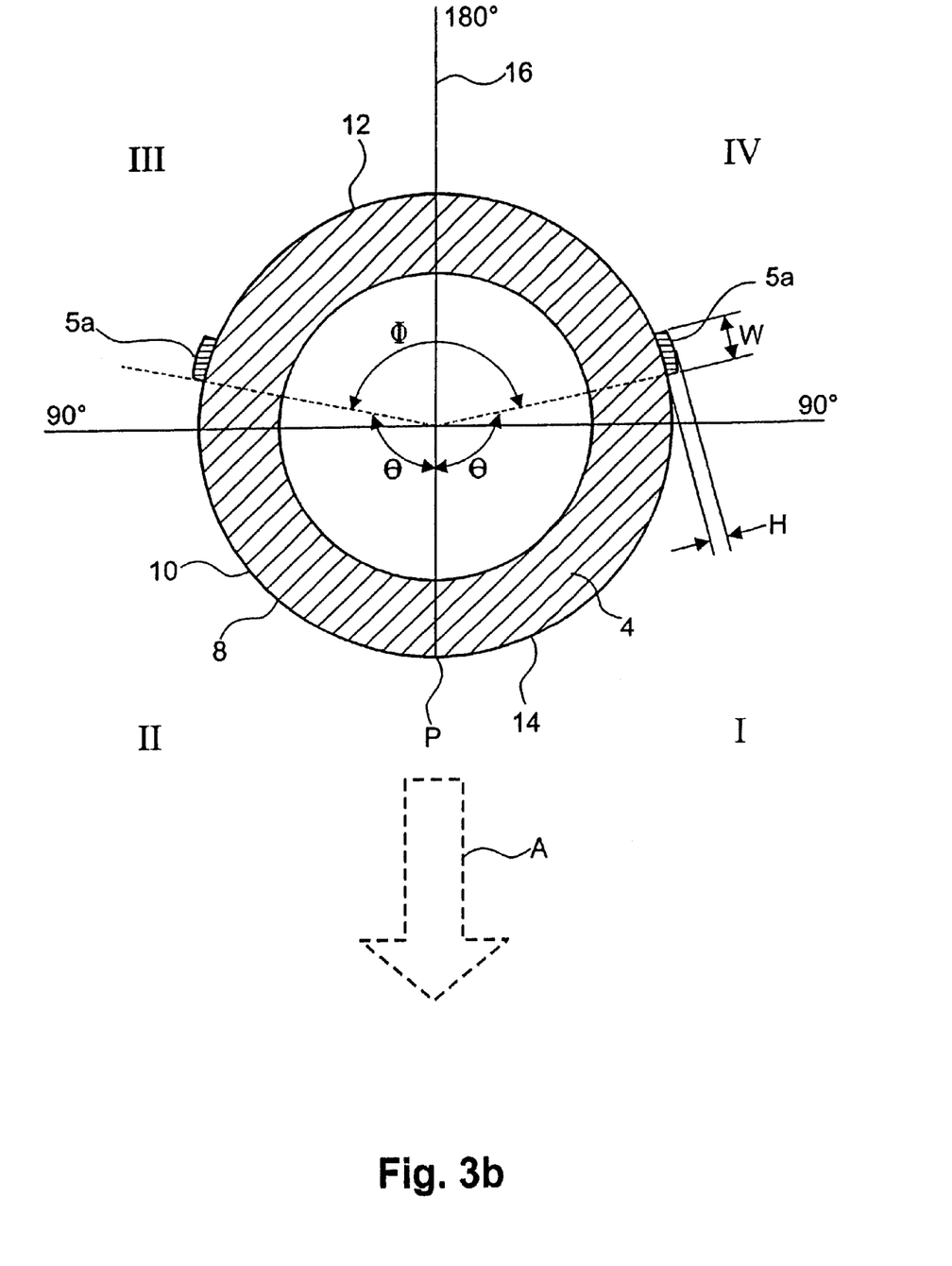
FIG. 3b is a cross sectional view of another embodiment of the shaft.

As shown in FIG. 3a, the location angle θ of raised ridges 5a and location angle α of raised ridges 5b are described in reference to the datum point P. Shaft 4 is symmetrical about a midplane intersecting the center and datum point P on shaft 4. As shown in FIG. 3a, shaft 4 includes four quadrants I, II, III, and IV. Quadrant I is located between 0° to 90° measured in a counterclockwise direction from datum point P. Quadrant II is located between 0° to 90° measured in a clockwise direction from datum point P. Quadrant III is located between 90° to 180° measured in a clockwise direction from datum point P. Quadrant IV is located between 90° to 180° measured in a counterclockwise direction from datum point P. The leading portion of the shaft, extending along quadrants I and II, in FIGS. 3a and 3b is smooth, rounded, and convex.

In the preferred embodiment of the present invention, there is at least one ridge located within quadrant III, and at least one ridge located within quadrant IV. Shaft 4 includes ridges only within quadrants III and IV. Quadrants I and II are thus free of said ridges, and the longitudinal ridges are located more than 90° from the leading edge of the shaft. The embodiment of the shaft of FIG. 3b has only two ridges 5a, located in quadrants III and IV. In an alternative preferred embodiment (shown in FIG. 2 and FIG. 3a), there are two ridges in each of quadrants III and IV, wherein two ridges 5a, 5b are located within quadrant III, and two ridges 5a, 5b are located within quadrant IV. A trailing portion 12 is disposed along trailing quadrants III and IV. In the preferred embodiment, the two ridges 5a are located at approximately the same angle, and the two ridges 5b are located at approximately the same angle. The two ridges 5a are located on the surface of the shaft at an angle of less than 180° apart. In the embodiment shown in FIGS. 3a and 3b, plane 16 bisects angle φ and extends between angle pairs α and 74. In other words, quadrants III and IV are symmetric about the midplane through datum point P. None of the ridges are located in quadrants I and II, on leading portion side 14 of shaft 4 facing the fluid flow.

Each ridge 5a, 5b extends longitudinally along shaft 4, far enough along shaft 4 to provide a reduction in air resistance when shaft 4 is moved at high speeds through a fluid. Ridges 5a, 5b may extend along the entire length of shaft 4 or may extend along only a portion of shaft 4. When golf club 1 is swung, the head end of shaft 4 moves the most quickly when golf club 1 is swung, and therefore this section derives the greatest benefit from the reduced air resistance. It is therefore preferable that at least a portion of ridges 5a, 5b is located near the head end of shaft 4. In the preferred configuration, ridges 5a, 5b begin at head 3 and extend along at least about ⅓ of the length of shaft 4.

Ridges 5a, 5b may be formed integrally with shaft 4 by mold stamping, filling, or by building up of material such as by painting, coating, or otherwise depositing layers of material. Alternatively, ridges 5a, 5b may be added to an already-formed shaft by coating, plating, painting, silk screen printing, plate printing, rust deposition, or other method known in the art. For example, ridges 5a, 5b may be formed by coating an existing shaft with an appropriate material, and the shaft and ridges may then be covered by a thin coating of paint 10 as shown in FIGS. 3a and 3b. In fact, the ridges themselves may also be formed with paint. Ridges 5a, 5b may also be added to an already-formed shaft by means of an adhesive sheet having preformed ridges. This sheet can easily be applied to an existing shaft to provide the desired resistance reducing properties. These methods are both simple and inexpensive.

Ridges 5a, 5b reduce the coefficient of drag by moving the separation point farther downstream along the shaft surface. As described above, the boundary layer separates from the shaft surface at the separation point and a broad wake is formed behind the shaft. The pressure on the rear of the shaft, in the wake, is low and approximately constant, whereas the pressure on the front of the shaft is high, so there is a net pressure force on the shaft. When the shaft is provided with ridges, as in the present invention, the boundary layer breaks into burbles, and as a result, the separation point moves downstream along the shaft surface. Moving the separation point and delaying the separation of the boundary layer then reduces the asymmetry of pressure distribution, which in turn reduces the coefficient of drag acting on the shaft and also the shape resistance.

Figure 4:
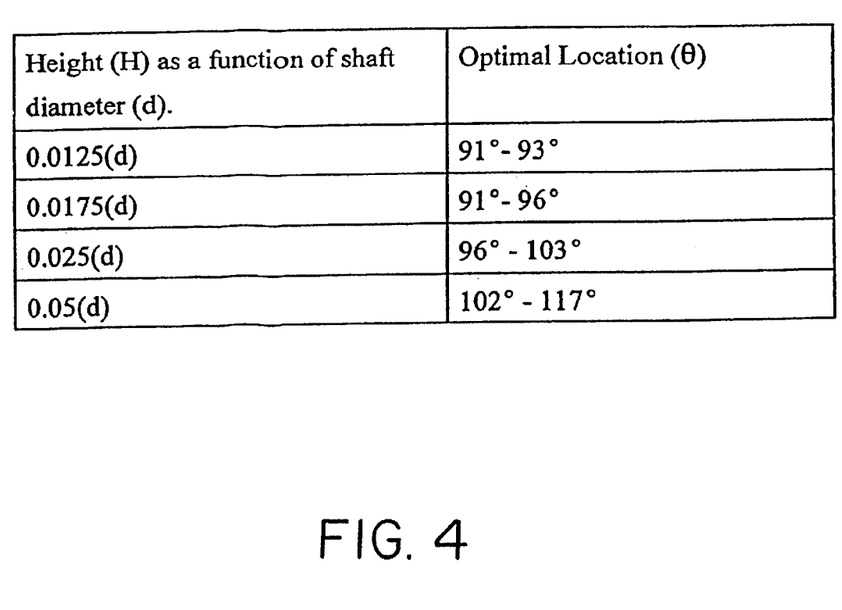
FIG. 4 is a chart setting forth preferred ridge heights and ridge location angles.

The optimal locations of the ridges are a function of their height H and the shaft diameter. These relationships are set forth in the chart in FIG. 4. As shown in FIG. 4, when the ridge height is around 0.0125 times the shaft diameter, the ridges should be placed within a range of approximately 91° to approximately 93° of the datum point P, or approximately 174° to approximately 178° apart. When the ridge height is around 0.0175 times the shaft diameter, the ridges should be placed within a range of approximately 91° to approximately 96° of the datum point P, or approximately 168° to approximately 178° apart. When the ridge height is around 0.025 times the shaft diameter, the ridges should be placed within a range of approximately 96° to approximately 103° of the datum point P, or approximately 154° to approximately 168° apart. In addition, when the ridge height is around 0.05 times the shaft diameter, the ridges should be placed within a range of approximately 102° to approximately 117° of the datum point P, or approximately 126° to approximately 156° apart. An embodiment of the invention has ridges with a height of about 0.05 to 0.0125 times the shaft diameter and which are located from about 126° to about 178° apart. Another embodiment has ridges with a height of approximately 0.05 times the shaft diameter and which are located from about 126° to about 156° apart.

More specifically, given a shaft diameter of approximately 10 mm, if the ridge height H is 0.125 mm, the ridges should be placed within 91° to 93° of the datum point P. Similarly, if the ridge height H is 0.175 mm, the ridges should be placed within about 91° to about 96° of the datum point P. If the ridge height H is 0.25 mm, the ridges should be placed within about 96° to about 103° of the datum point P. Finally, if the ridge height H is 0.5 mm, the ridges should be placed within about 102° to about 117° of the datum point P. When the ridge height H and location angle θ are determined based on this relationship, the separation point at which fluid flow becomes disturbed moves downstream along the shaft surface, thereby reducing the coefficient of drag.

The most preferred embodiment of the present invention is a golf club 1 as shown in FIGS. 1–3b. The golf club 1 includes a shaft 4 having two sets of two ridges 5a, 5b, wherein all four ridges have a height H of 0.25 mm and a width W of 1.0 mm, wherein one set of two ridges are located at an angle of approximately 100°, and wherein the other set of two ridges are located at an angle of approximately 130°. In an alternative embodiment, the second set of ridges 5b may have an alternative shape, such as square, circular, or semi-circular. In another embodiment of the present invention, shaft 4 includes two ridges 5a, 5b, having a width W of approximately 1.0 mm, a height H of approximately 0.25 mm, and a location angle of approximately 100°.

When the golf club 1 is moved at a high speed, the relative speed of air flow about its shaft 4 becomes large. This air flow then separates from the shaft surface at the separation point, and vortices are shed alternately from the shaft. As explained above, these vortices trail behind the shaft in two rows called a Karman's vortex street. Due to this Karman's vortex street, a force operates in an opposite direction to the moving direction of a shaft (shown by arrow A in FIGS. 2 and FIGS. 3a and 3b) and increases the shape resistance.

With conventional shafts that do not include ridges, the boundary layer becomes detached while maintaining its condition as a layer. But with the shaft of the present invention, the boundary layer changes into turbulent flow, and the separation point moves farther downstream along the shaft surface. By thus moving and delaying the detachment of the air flow, the shape resistance becomes reduced.

As described above, with the golf club 1 of the present invention, shape resistance of shaft 4 is significantly reduced. Therefore, it becomes possible to increase the speed of the club 1 when it is swung. In addition, ridges 5a, 5b function to reduce the asymmetry of pressure distribution in the front and back of shaft 4 and to suppress aerodynamic lift from being generated. Thus, a player may swing the club 1 with increased stability, thus striking the ball more accurately.

EXAMPLE

Shaft 4 of the present invention was tested in a wind tunnel by the Japan General Architectural Testing Institute, using uniform air flow generated in an Eiffel-type blowdown boundary-layer tunnel. The data from these tests are presented in FIGS. 5 to 8. The model shaft used in these tests was four times the size of an actual shaft, having a diameter of 39 mm and a length of 400 mm.

The measurement system used for these tests included a weight (or load) detector or wind-tunnel balance, a pressure transducer, a computer, and an A/D converter. The wind-tunnel balance was obtained from Nissho Denki, and had a capacity of Fx=±5 kgf, Fy=±5 kgf, Mx=2 kgf·m, My=2 kgf·m, and Mz=0.5 kgf·m. The pressure transducer was a capacitance-operated pressure transducer DP-50A obtained from Okano Seisakusho and having a capacity of 50 kgf/m². The computer was a Gateway 2000 G6-200, with a 200 MHZ Pentium Pro and 128 MB memory. The A/D converter was an ATMIO-64E-3 (12 bit, 64 ch) obtained from National Instruments.

Figure 9:
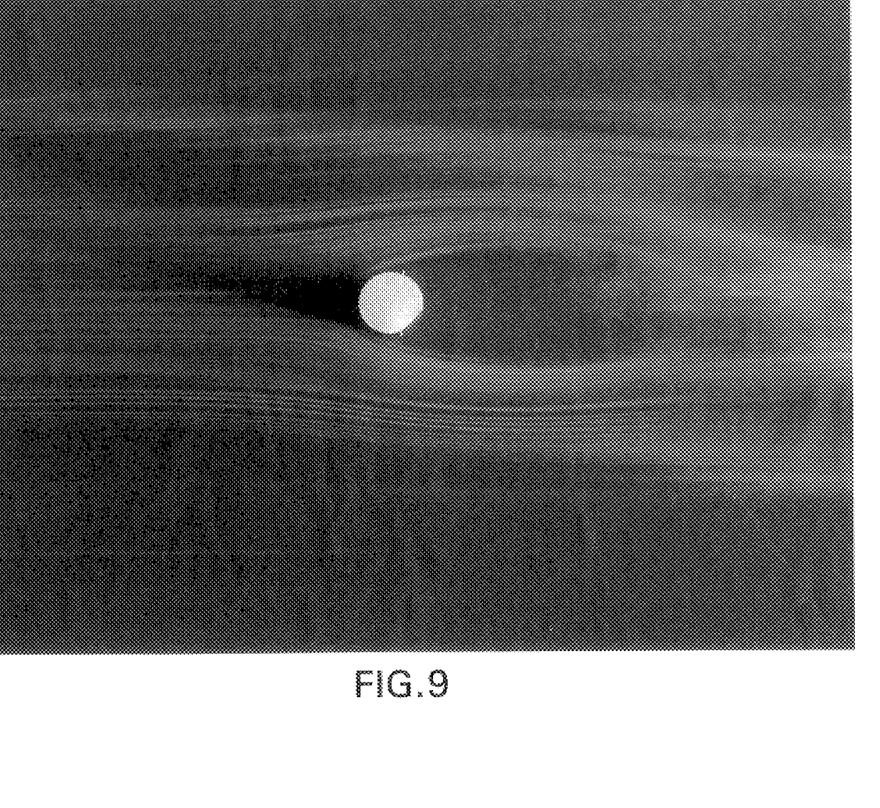
FIG. 9 shows a shaft having only two ridges being tested in a wind tunnel.
Figure 10:
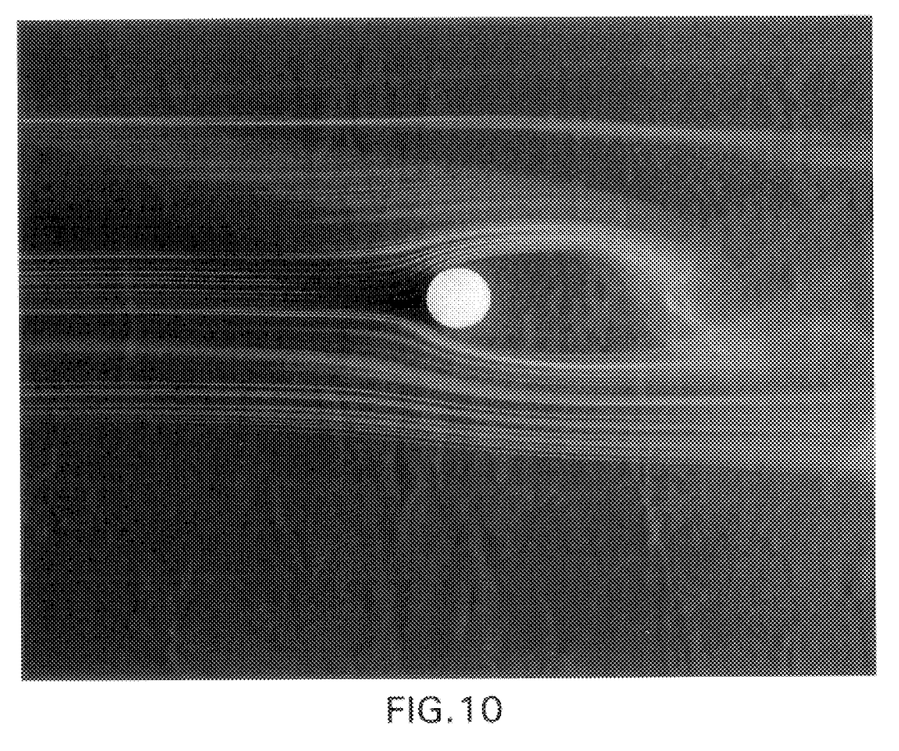
FIG. 10 shows a shaft without ridges being tested in a wind tunnel.

The resistance and the fluctuation of aerodynamic lift of the test model were measured by attaching the test model to the wind-tunnel balance (load detector) and blowing the air at the test model as shown in FIG. 9 and FIG. 10. End boards were attached above and below the test model to maintain air flow in two dimensions. By adjusting the flow conditions to match actual flow conditions that would be encountered by an actual shaft, the data obtained with the test model accurately reflect values that would be obtained by testing an actual shaft. For example, the testing conditions were set such that the Reynolds number for the test model was approximately the same as the Reynolds number for an actual shaft. Specifically, the Reynolds number was $2.6 \times 10^4$. To match the Reynolds number, the wind velocity was set to ¼ of the wind velocity typically encountered by an actual shaft, i.e., ¼ of 40 m/s, which is 10 m/s. The resistance and the fluctuation of resistance were measured by entering the voltage output from the wind-tunnel balance into the computer via the A/D converter. The sample frequency was set to 200 Hz and the mean value of the resistance (mean resistance) and the standard deviation of lift fluctuation were obtained based on 20480 of time-history data points obtained within about 100 seconds. In addition, for reference, the frequency of Karman vortex shedding was obtained by FFT analysis based on the time-history data of the lift fluctuation and from the prevailing frequency of the power spectrum density. The resistance coefficient for the test model having no ridges was found to be approximately 1.111.

Based on the results obtained from the test model, it was determined that the optimal cross-sectional shape for the ridges are circular and rectangular. Smaller shafts (such as those that would actually be used for a golf shaft or other sports equipment) were then tested in the wind tunnel described above. The wind velocity used in these tests was 16 m/s.

Figure 5:
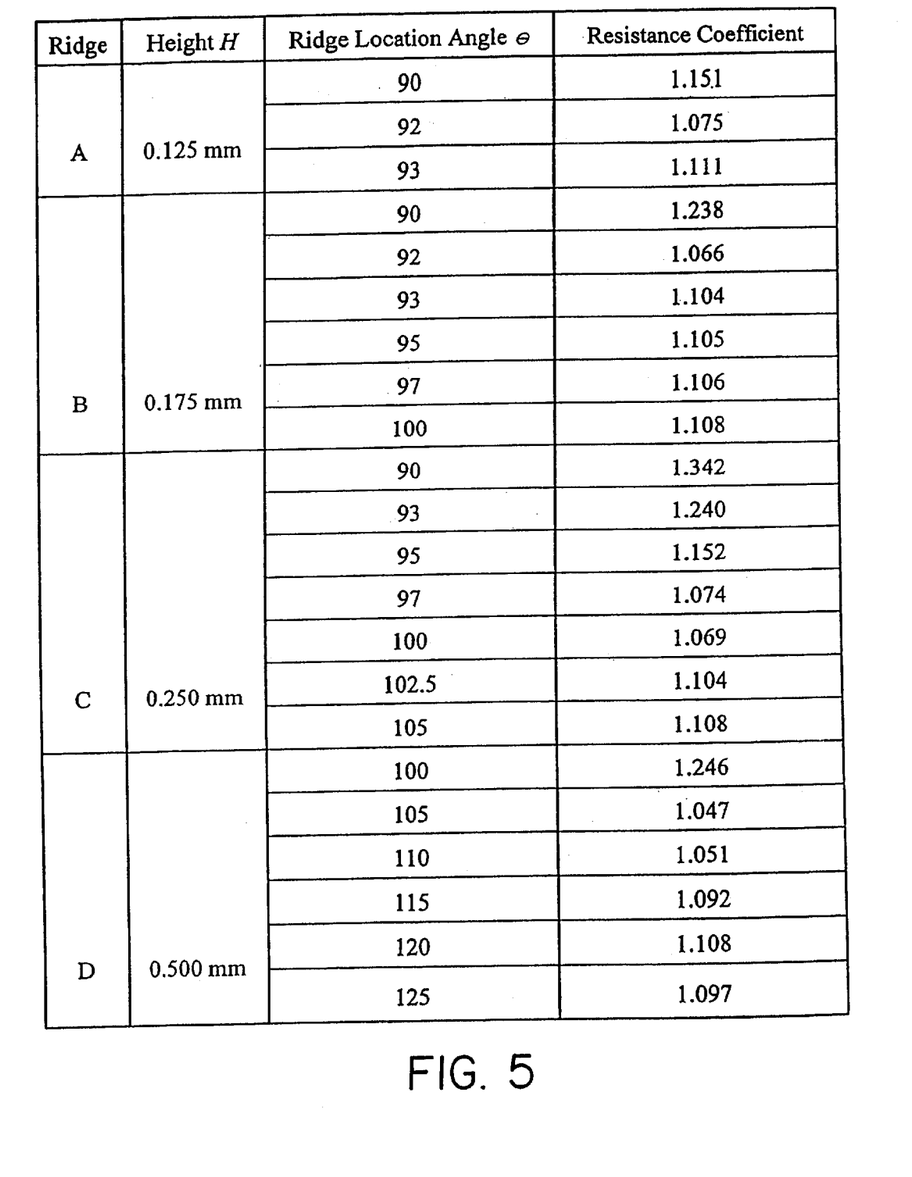
FIG. 5 is a chart setting forth resistance coefficients for a shaft having two circular ridges of given heights and location angles.

The chart shown in FIG. 5 shows results of wind tunnel tests on a shaft having two ridges. The shaft has a generally circular cross section with a diameter of 10 mm, and each ridge also has a generally circular cross section. The second column in this chart is the height H of the ridges, which in this case is also the diameter of the ridges. The third column is the location angle θ at which the ridges are located, wherein the ridges are located at θ from the datum point P, one in the clockwise direction and the other in the counter-clockwise direction. The fourth column is the measured resistance or drag coefficient. As shown in the chart, the height H of the ridges was set at 0.125 mm, 0.175 mm, 0.250 mm, and 0.500 mm. For each of these ridge heights, the location angle θ was varied between approximately 90° and approximately 125°. Shape resistance varies proportionally with the resistance coefficient. In other words, the smaller the resistance coefficient, the smaller the shape resistance. These results are also displayed in the graph of FIG. 6, wherein resistance coefficient is plotted on the y-axis and ridge location angle θ is plotted on the x-axis. The (A) line corresponds to the data obtained with a shaft having ridge height of 0.125 mm. The (B) line corresponds to the data obtained with a shaft having ridge height of 0.175 mm. The (C) line corresponds to the data obtained with a shaft having ridge height of 0.250 mm. The (D) line corresponds to the data obtained with a shaft having ridge height of 0.500 mm.

Figure 6:
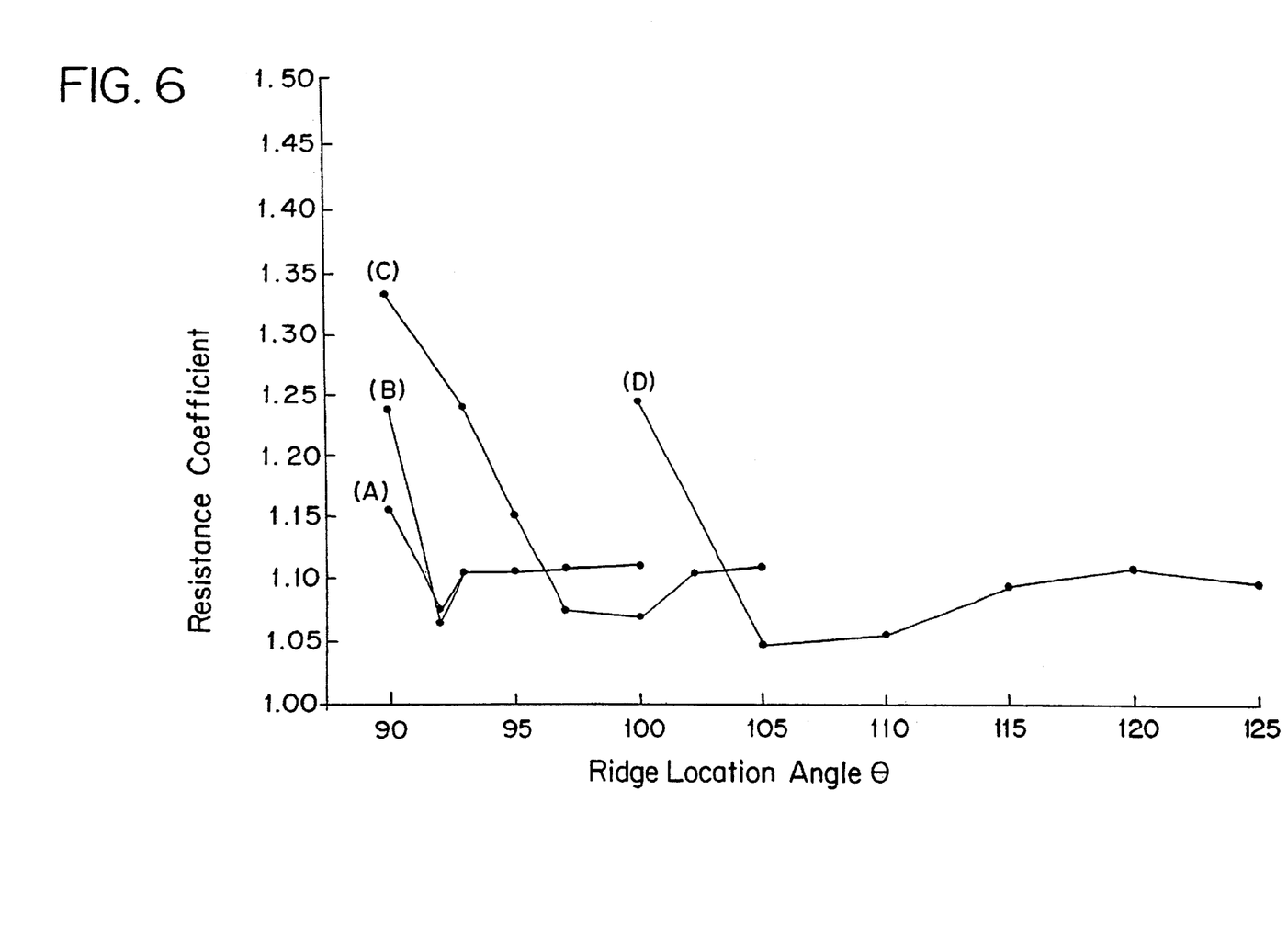
FIG. 6 is a graph of the results shown in FIG. 5.

The following can be concluded from the results show in FIGS. 5 and 6: (1) the resistance coefficient changes significantly when the ridge height H or the ridge location angle θ changes; (2) the resistance coefficient changes significantly when the location angle θ is less than 90°; and (3) when the ridge height H is large, it is believed that the resistance coefficient can be reduced further by increasing the ridge location angle. In other words, the resistance coefficient may be reduced by altering either or both ridge height H and ridge location angle θ.

Referring to FIGS. 5 and 6, when the ridge height H is approximately 0.25 mm, the optimal ridge location angle θ is in the range from around 96° to around 103°. For location angles θ smaller than approximately 96°, the resistance coefficient increases, and for location angles θ exceeding approximately 103°, the resistance coefficient becomes roughly constant. As shown in FIG. 6, for each ridge height, the minimum resistance coefficient may be found within an easily identifiable range of ridge locations. This range is different depending on the ridge height. Below this range, the resistance coefficient increases relatively sharply, and above this range, the resistance coefficient increases and then becomes roughly constant.

More specifically, for a shaft with ridges having a height H of approximately 0.125 mm, the optimal range of ridge location angles θ is from around 91° to around 93°. For a shaft with ridges having a height H of approximately 0.175 mm, the optimal range of ridge location angles θ is from around 91° to around 96°. As mentioned above, for shafts with ridges having a height H of approximately 0.250 mm, the optimal range of ridge location angles θ is from around 96° to around 103°. Finally, for shafts with ridges having a height H of approximately 0.500 mm, the optimal range of ridge location angles θ is from around 102° to around 117°.

Figure 7A:
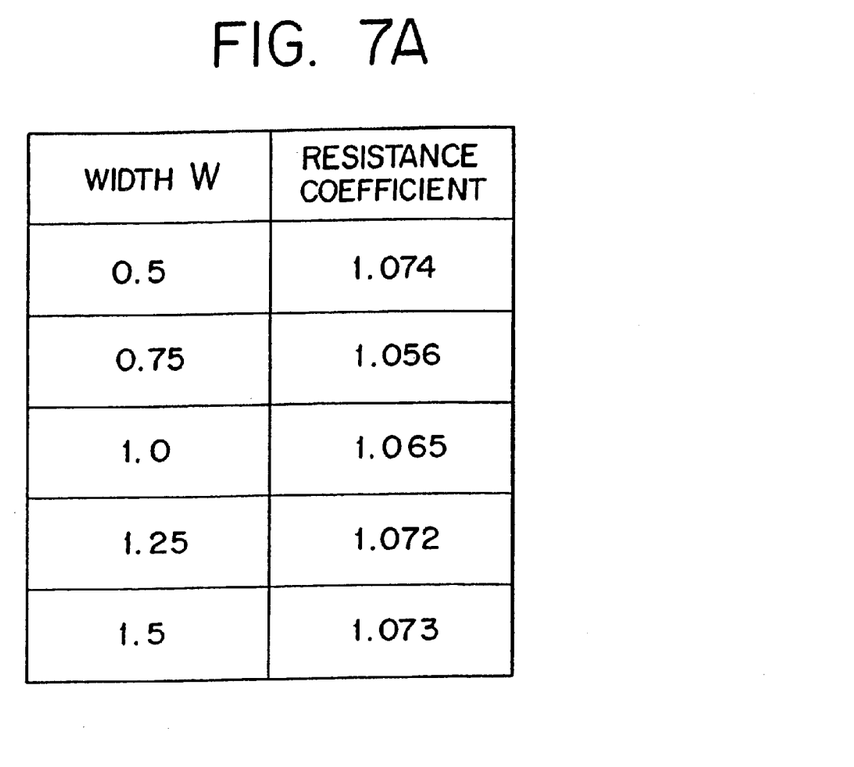
FIG. 7a is a chart setting forth resistance coefficients for a shaft having generally rectangular ridges with varying ridge widths.
Figure 7B:
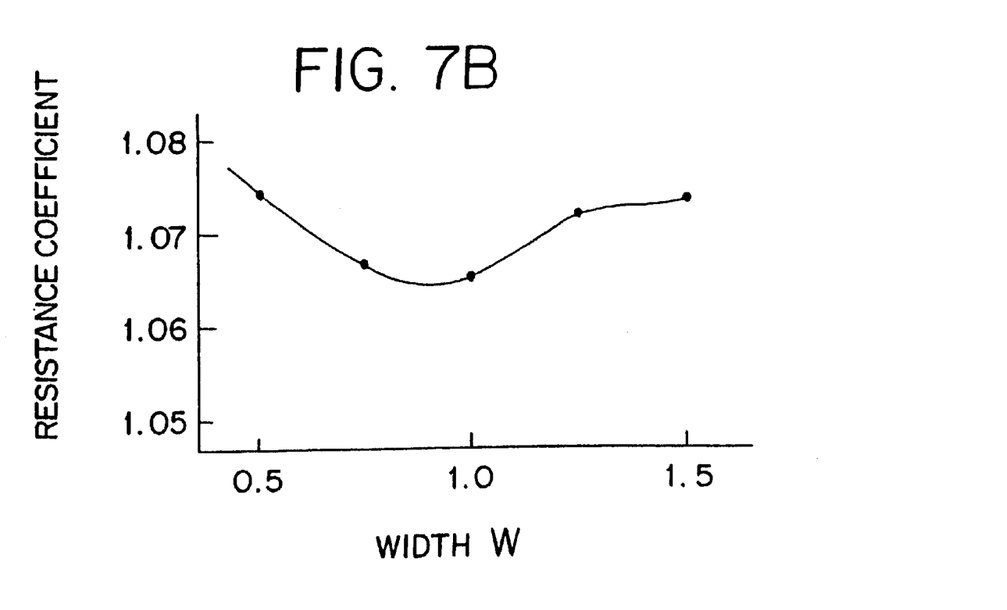
FIG. 7b is a graph of the results shown in FIG. 7(a)

The charts shown in FIGS. 7(a) and 7(b) show results of wind tunnel tests on a shaft having two ridges, wherein each ridge is generally rectangular in cross-section. The shaft has a generally circular cross section with a diameter of approximately 10 mm, and each ridge has a height of about 0.25 mm and a location angle of about 100°. These tests were conducted to determine the effect of the ridge width W on the resistance coefficient. Accordingly, the width W of the ridges were varied from around 0.5 mm to around 1.5 mm. As shown by the charts, the preferred width W is in the range of from around 0.75 mm to around 1.00 mm. Above and below this range, the resistance coefficient increases.

Figure 8A:
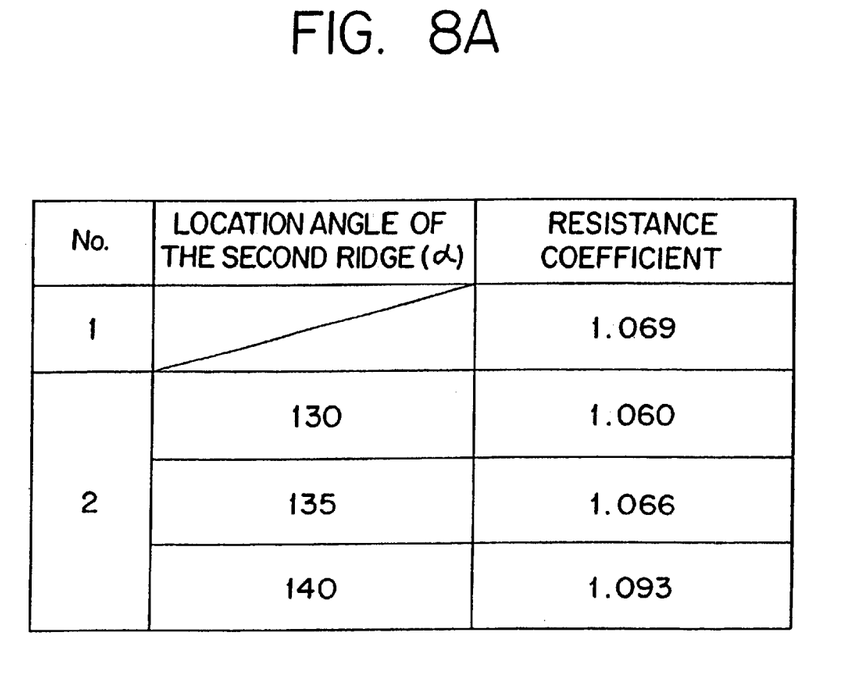
FIG. 8a is a chart setting forth resistance coefficients for a shaft having two sets of circular ridges with varying distances between the sets of ridges.
Figure 8B:
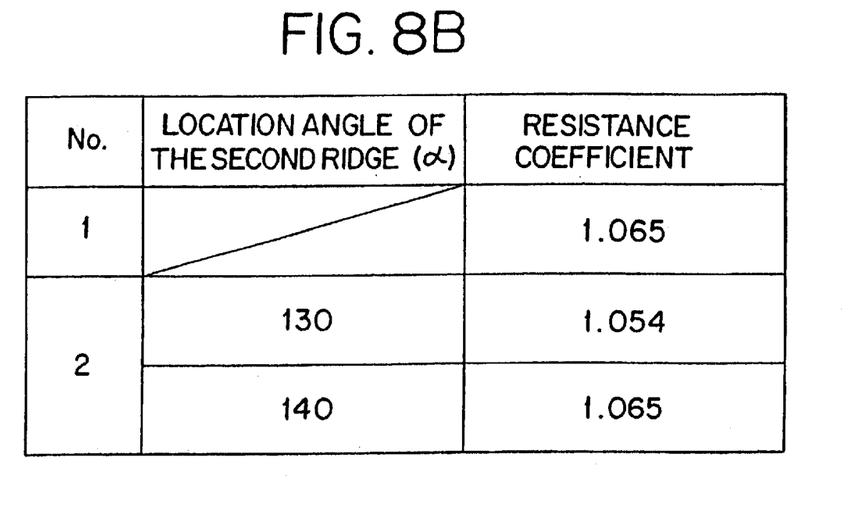
FIG. 8b is a chart setting forth resistance coefficients for a shaft having two sets of generally rectangular ridges with varying distances between the sets of ridges.

The charts shown in FIGS. 8(a) and 8(b) show results of wind tunnel tests on a shaft having a total of four ridges or two sets of two ridges 5a, 5b. The shaft has a generally circular cross section with a diameter of 10 mm. More specifically, FIG. 8(a) shows test results on a shaft having two sets of ridges 5a, 5b that are generally circular in cross section, having a diameter of approximately 0.25 mm. The first set of ridges 5a are located at an angle θ of approximately 100°, and the location angle α of the second set of ridges 5b is varied between from around 130° to around 140°. FIG. 8(b), on the other hand, shows test results on a shaft having two sets of ridges 5a, 5b that are generally rectangular in cross section, having a height of approximately 0.25 mm and a width of approximately 1 mm. The first set of ridges 5a are located at an angle θ of approximately 100°, and the location angle α of the second set of ridges 5b is varied between from approximately 130° to around 140°. For purposes of comparison, the charts in FIG. 8(a) and 8(b) also show in the first row of data, the resistance coefficient for a shaft having only one set of ridges. As shown in these charts, the resistance coefficient may be reduced with the addition of a second set of ridges 5b. However, the resistance coefficient will increase as the angle α increases. In other words, the resistance coefficient may be minimized as long as the ridges are maintained within a certain distance from each other (i.e., approximately 30°).

Although the shaft of the present invention has been described in the context of a golf club, the present invention may be incorporated in other sports devices. Most of these devices will include a grip on one end of the shaft, such as a club, pole, bat, handlebars of a bicycle or the like. Often, the opposite end of the shaft includes a club or striking head. Generally, the grip is used to move the devices, such as baseball bats, tennis rackets, and fishing poles, which are typically moved at high speeds in generally a single direction. The present invention also may be incorporated in objects having a shaft-like member about which high speed fluid flow may occur, such as tubular bicycle frame members, antennae, electrical wires, and electrical poles. By forming ridges upon these objects, the generation of negative pressure can be minimized, thereby increasing the resistance of these objects to strong winds. In addition, ridges may be formed on objects that are subject to high speed water flow.

It will be readily apparent to those skilled in the art that other variations of the shaft features exist which fall within the scope of the appended claims.

What is claimed is:

1. A sports shaft dimensioned to be grasped and moved through a fluid by a user and having a length, two distinct ends, and an outer surface:
   one of said ends including a grip attached thereto;
   said shaft also having a leading portion having a leading edge, a trailing portion, and at least two longitudinal ridges extending outwardly from the surface of the shaft and positioned at an angle of less than 180° apart, with the ridges extending along at least a portion of the length of the shaft on the trailing portion thereof;
   said ridges including a generally uniform cross-section;
   said shaft configured to be moved through the fluid with the leading portion contacting the fluid prior to the trailing portion;
   wherein an imaginary plane that bisects the angle and passes through the shaft includes the leading edges;
   said imaginary plane extending outwardly from the leading edge to indicate the direction of travel of the leading edge of the shaft through the fluid;
   the leading portion having a generally uniform cross-section configured to generate a boundary layer fluid flow upon movement of the leading edge through the fluid; the ridges being positioned for changing the boundary layer fluid flow to a turbulent flow in the trailing portion so that fluid resistance encountered by the shaft as it is moved through the fluid is reduced.

2. The shaft of claim 1, wherein the at least two ridges comprise only two ridges.

3. The shaft of claim 1, wherein the trailing portion is disposed in two trailing quadrants divided by said imaginary plane, and at least one of the ridges is disposed in each of the trailing quadrants.

4. The shaft of claim 3, wherein the leading portion is substantially smooth, rounded, and convex.

5. The shaft of claim 4, wherein the leading portion is free of said ridges.

6. The shaft of claim 1, wherein the shaft has a generally circular cross-sectional area, and a cross-sectional diameter, which is generally constant along a substantial portion of the length of the shaft.

7. The shaft of claim 6, wherein the ridges have a height of about 0.05 to 0.0125 times the shaft diameter and are located from about 126° to about 178° apart.

8. The shaft of claim 7, wherein the ridges have a height of about 0.0125 times the shaft diameter and are located from about 174° to about 178° apart.

9. The shaft of claim 7, wherein the ridges have a height of approximately 0.0175 times the shaft diameter and are located from about 168° to about 178° apart.

10. The shaft of claim 7, wherein the ridges have a height of approximately 0.025 times the shaft diameter and are located from about 154° to about 168° apart.

11. The shaft of claim 7, wherein the ridges have a height of approximately 0.05 times the shaft diameter and are located from about 126° to about 156° apart.

12. The shaft of claim 1, wherein each ridge has a width of about 1 mm and a height of about 0.25 mm.

13. The shaft of claim 1, further comprising a golf club head disposed on the end opposite from the grip.

14. The shaft of claim 1, wherein the shaft forms a portion of a golf club, a baseball bat, a fishing pole, a ski pole, a tennis racket, a lacrosse stick, a bicycle frame member, or a rowing oar, wherein the surface of the shaft and the ridges are covered by a coating.

15. The shaft of claim 1, wherein the leading portion is disposed in two front quadrants extending from the leading edge at said plane to a location on the surface 90° therefrom, and the trailing portion extends from said location to a trailing edge on said plane.

16. A golf club comprising:
   a golf club shaft dimensioned to be grasped and moved through a fluid by a user and having a length, two distinct ends, and an outer surface; and
   one of said ends including a grip attached thereto and a head attached to the other end;
   said shaft also having a leading portion having a leading edge, a trailing portion, and at least two longitudinal ridges extending outwardly from the surface of the shaft and positioned at an angle of less than 180° apart, with the ridges extending along at least a portion of the length of the shaft on the trailing portion thereof;
   said ridges including a generally uniform cross-section;
   said shaft configured to be moved through the fluid with the leading portion contacting the fluid prior to the trailing portion;
   wherein an imaginary plane that bisects the angle and passes through the shaft includes the leading edge;
   said imaginary plane extending outwardly from the leading edge to indicate the direction of travel of the leading edge of the shaft through the fluid;
   the leading portion having a generally uniform cross-section configured to generate a boundary layer fluid flow upon movement of the leading edge through the fluid;
   the ridges being positioned for changing the boundary layer fluid flow to a turbulent flow in the trailing portion so that fluid resistance encountered by the shaft as it is moved through the fluid is reduced;
   wherein the ridges extend along at least one third of the length of the shaft on the trailing portion thereof, beginning from the end of the shaft that is attached to the head of the club.

17. The golf club of claim 16 wherein the longitudinal ridges are located more than 90° from the leading edge of the shaft.

18. The golf club of claim 16 wherein the longitudinal ridges are located on the shaft symmetrically about a plane passing through the leading edge of the shaft.

19. The golf club of claim 16 wherein the surface of the shaft and the ridges are covered by a coating.

20. The golf club of claim 16, wherein the ridges have a generally rectangular cross-section.

21. The golf club of claim 16, wherein the leading portion of the surface having a substantially smooth, rounded, and convex shape.

22. The golf club of claim 21, wherein the leading edge surface has a substantially circular cross-section free of said ridges.

* * * * *

UNITED STATES PATENT AND TRADEMARK OFFICE
CERTIFICATE OF CORRECTION

PATENT NO. : 6,609,981 B2
DATED : August 26, 2003
INVENTOR(S) : Hirata

It is certified that error appears in the above-identified patent and that said Letters Patent is hereby corrected as shown below:

Title page,
After item [63], Related U.S. Application Data, please insert the following:

-- [30]  Foreign Application Priority Data
      JP   11-100627 ................... 04/1999
      JP   11-002748 ................... 04/1999 --

Column 9,
Line 58, change "shalt" to -- shaft --.

Signed and Sealed this

Twenty-third Day of December, 2003

JAMES E. ROGAN
*Director of the United States Patent and Trademark Office*